United States Patent Office 2,760,938
Patented Aug. 28, 1956

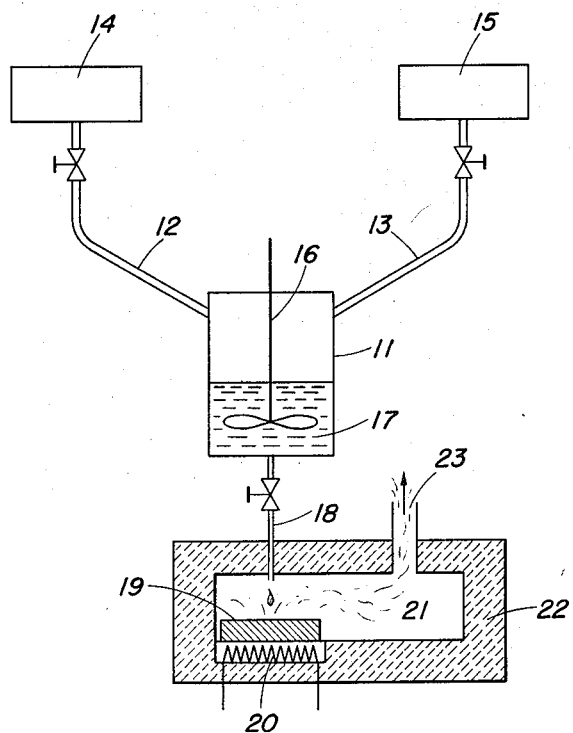
Fig. I.
Augustine N. Dempster
Roy J. Mundy
INVENTORS

2,760,938

PREPARATION OF VAPOR MIXTURES

Augustine N. Dempster, Fords, and Roy J. Mundy, Colonia, N. J., assignors to National Lead Company, New York, N. Y., a corporation of New Jersey Application September 4, 1951, Serial No. 245,032

2 Claims. (Cl. 252—372)

This invention relates to a method of preparing vapor mixtures. More specifically it relates to the preparation of proportioned mixtures of vapors.

Many methods are used to form mixtures of compounds in gaseous or vapor forms. Among the methods most widely used is one in which the individual compounds or components are heated separately to the vapor state and the vapors are mixed to form an intimate mixture. When preparing mixtures by this method the individual vapor components are passed through flow meters and other measuring devices before they are mixed. The uniformity of the gaseous mixtures is dependent upon the accuracies and consistencies of the metering devices. Each measuring device, however, is limited to a certain flow range for optimum accuracy, therefore, for uniform proportioned mixtures of vapors great pains must be exerted in selecting accurate and consistent metering devices for the particular flow of vapors desired. It is substantially impractical to obtain accurate and consistent mixtures of vapors when one or more constituents is present in extremely small quantities.

All compounds have their own specific boiling points and therefore one cannot admix them and heat the mixture to form proportioned vapor mixtures unless they form azeotropic or constant boiling point mixtures which rarely would take place. It is desirable therefore to be able to utilize a method which would form proportioned mixtures of vapors without employing gaseous measuring devices.

An object of the present invention therefore is to provide a method for the preparation of proportioned intimate mixtures of a plurality of constituents in gaseous form. Another object is to provide a method for the preparation of proportioned mixtures in gaseous form which is simple to utilize and which does not require complicated and expensive proportioning or measuring apparatus. A still further object is to provide a method for the preparation of a proportioned intimate mixture of a plurality of constituents in gaseous form which does not require vapor measuring devices.

In its broadest aspects this invention contemplates a method for forming proportioned intimate mixtures of a plurality of constituents in gaseous form which comprises forming a fluid mixture of said constituents containing at least one of said constituents in liquid form and transferring successive portions of said mixture to a surface heated to a temperature sufficient to completely and substantially instantaneously volatilize said portion.

It has been found that constant proportioned mixtures of vapors may be prepared by first thoroughly admixing the individual constituents in the desired proportions in the fluid state and then transferring the mixture to a hot surface which has been heated substantially above the boiling point of the highest boiling constituent. In this way vaporization or volatilization occurs completely and substantially instantaneously and the resulting vapor mixture will contain the desired proportion of each constituent. In order to form an intimate mixture of the constituents, it is necessary to have at least one of the constituents in the liquid state. It is preferred to have the constituents all in liquid form. However, if one or more of the constituents is present in the solid form, it is an easy matter to form a fluid slurry by thoroughly mixing the solid constituents with the liquid constituents. Such a fluid mixture or slurry is easily transferred to a hot surface and an intimate gaseous mixture is easily formed. Substantially any gaseous mixture may be obtained by the process of the instant invention providing a fluid mixture or fluid slurry may be obtained by admixing the individual components.

Any type of admixing may be employed providing a homogeneous fluid or fluid slurry is obtained. Any type of agitation or other stirring means may be used to admix the individual constituents. Many types of apparatus may be employed for vaporizing the intimate mixture. A type of apparatus which is particularly advantageous to employ in producing a proportioned vapor mixture according to the present invention is illustrated in Fig. 1 in which a suitable mixing tank 11 is provided with separate inlet means, 12, 13, through which the desired portions of the various constituents are fed from the storage tanks 14 and 15. The various constituents may be separately measured either by weight or volume before being added to the mixing chamber. The mixing chamber 11 may be provided with a suitable mixing device such as rotary agitator 16. The fluid mixture 17 upon becoming homogeneous in mixing chamber 11 passes through outlet 18 and contacts heated surface 19 which is heated by electrical element 20. The heated surface 19 is enclosed in a vaporization chamber 21 which may be provided with an insulating coating 22. The fluid mixture 17 upon contacting the heated surface 19 is immediately and completely volatilized in chamber 21 and the vapors are conducted away from the heated surface by means of conduit 23. As previously mentioned, the heated surface 19 is heated to a temperature substantially in excess of the boiling point of the highest boiling constituent and therefore the fluid mixture is completely and substantially instantaneously volatilized.

As stated previously, substantially any types of material may be admixed to form an intimate vapor mixture. It is particularly desirable to utilize this process when intimate vapor mixtures of volatile halides, and similar compounds are to be formed. For example in the preparation of titanium dioxide pigment by decomposing titanium tetrachloride vapors, it has been found desirable to use titanium tetrachloride containing small but controlled amounts of other metallic halides, usually in the order of one or two per cent. Thus it is possible by the method of the instant invention to add small portions of aluminum chloride, phosphorus chloride, silicon chloride, antimony chloride, tin chloride, etc. to titanium tetrachloride to form proportioned vapor mixtures.

In order to more fully illustrate the instant invention, the following examples are presented:

*Example 1*

An apparatus substantially identical to that shown in Fig. 1 was used to prepare a homogeneous and constant proportioned mixture of 99.0% titanium tetrachloride and 1.0% silicon tetrachloride. 99 parts of liquid titanium tetrachloride were admixed with 1 part of liquid silicon tetrachloride in a container. The constituents were then rapidly agitated to form an intimate and homogeneous liquid mixture. The mixture was then allowed to drop on a heated surface to vaporize the constituents in the proportioned liquid mixture. The surface was heated to about 250° C. which is substantially above the boiling points of the tetrachlorides employed. The boiling point of titanium tetrachloride is 136.4° C., while the boiling point of silicon tetrachloride is 57.6° C. Upon dropping the mixture onto a heated surface at a rate of 2 parts per minute, a continuous homogeneous and constant proportioned mixture of vaporized titanium tetrachloride and silicon tetrachloride was obtained. Such a vaporous mixture of titanium tetrachloride containing a small amount of silicon tetrachloride was oxidized to produce titanium dioxide pigments.

*Example 2*

Using the procedure described above, a vapor mixture of titanium tetrachloride and aluminum chloride was formed. Again 99 parts of titanium tetrachloride were admixed with 1 part of aluminum chloride in a container. The mixture was then rapidly agitated to form an intimate and homogeneous fluid slurry. The aluminum chloride was substantially insoluble in titanium tetrachloride and therefore was evenly distributed throughout the liquid titanium tetrachloride upon agitation. The homogeneous fluid slurry was then allowed to drop on a heated surface to vaporize the constituents in the proportioned mixture. Again the constituents were substantially instantaneously volatilized together to form a predetermined proportioned vapor mixture. The surface was heated to about 300° C. which is substantially above the boiling points of the constituents. The boiling point of titanium tetrachloride is 136.4° C., while the boiling point of aluminum chloride is 183° C.

The homogeneous and proportioned vapor mixture of titanium tetrachloride containing a small amount of aluminum chloride was used for the preparation of titanium dioxide pigments just as in Example 1.

It has clearly been shown from the above description and by the examples presented that intimate mixtures may be obtained by forming a fluid mixture of the constituents containing at least one of the constituents in a liquid form and transferring successive portions of the mixture to a surface heated to a temperature sufficient to completely and substantially instantaneously volatilize the portions. The process of the instant invention provides proportioned mixtures of vapors by a simple method which does not require complicated and expensive proportioning or measuring apparatus. This method does not require the use of gaseous measuring devices which normally are complicated and expensive to employ and have certain limitations in accuracy at varying flow rates.

While this invention has been described and illustrated by the examples shown, it is not intended to be limited thereto and other modifications and variations may be employed within the scope of the following claims.

We claim:

1. Method for forming a predetermined proportioned intimate mixture of titanium tetrachloride and silicon tetrachloride in gaseous form which comprises the steps of admixing said constituents in said predetermined proportion, and transferring successive portions of said admixture to a surface heated to a temperature substantially above 136° C. to completely and substantially instantaneously volatilize each of the constituents of said admixture.

2. Method for forming a predetermined proportioned intimate mixture of titanium tetrachloride and aluminum chloride in gaseous form which comprises the steps of admixing said constituents in said predetermined proportion, and transferring successive portions of said admixture to a surface heated to a temperature substantially above 183° C. to completely and substantially instantaneously volatilize each of the constituents of said admixture.

References Cited in the file of this patent

UNITED STATES PATENTS

| Number | Name | Date |
|---|---|---|
| 2,074,973 | Lawton et al. | July 21, 1936 |
| 2,175,790 | Booker | Oct. 10, 1939 |
| 2,311,635 | Britt | Feb. 23, 1943 |
| 2,336,493 | Marks | Dec. 14, 1943 |
| 2,428,905 | Bilan | Oct. 14, 1947 |
| 2,441,225 | Pechukas | May 11, 1948 |
| 2,453,423 | Emerson et al. | Nov. 9, 1948 |